United States Patent

[11] 3,549,153

[72] Inventor Tomoo Atsumi
Daito-shi, Japan

[21] Appl. No. 693,490
[22] Filed Dec. 26, 1967
[45] Patented Dec. 22, 1970

[73] Assignee Matsushita Electric Industrial Co., Ltd.
Kadoma-shi, Osaka, Japan
a corporation of Japan

[32] Priority Mar. 29, 1967
[33] Japan
[31] Nos. 42/20418, 42/26771, 42/20427, 42/20428, 42/20420 and 42/20421

[54] AUTO-CHANGER
5 Claims, 13 Drawing Figs.

[52] U.S. Cl. ........ 274/10, 274/23
[51] Int. Cl. ........ G11b 17/00
[50] Field of Search ........ 274/10, 13, 14, 15, 9, 23, 23.1, 23.2

[56] References Cited

UNITED STATES PATENTS

| | | | |
|---|---|---|---|
| 3,321,205 | 5/1967 | Dennis | 274/10 |
| 3,243,188 | 3/1966 | Caddy | 274/10 |
| 3,218,078 | 11/1965 | Freier | 274/10 |
| 2,983,515 | 5/1961 | Vistain | 274/10 |

*Primary Examiner*—Harry N. Haroian
*Attorney*—Stevens, Davis, Miller and Mosher

ABSTRACT: An auto-changer which is capable of playing a plurality of records mounted on the changer spindle at the center of the turntable in sequence automatically successively by dropping said records on the turntable one after another, detecting the diameter of the record being dropped on the turntable, automatically moving the pickup arm horizontally and then downwardly to locate it at the starting position of the sound track on the record to play said record, and upon completion of the playing lifting and returning the pickup arm automatically to its original position for the next cycle of operation, and which, when all the records have been played, returns the pickup arm to its original position and brings the entire mechanism of the auto-changer to an inoperative position automatically.

INVENTOR

TOMOO ATSUMI

BY Stevens, Davis, Miller & Mosher

ATTORNEYS

INVENTOR
TOMOO ATSUMI

BY Storms, Davis, Miller & Hoster

ATTORNEYS

INVENTOR
TOMOO ATSUMI

BY

ATTORNEYS

INVENTOR
TOMOO ATSUMI

BY [signature]

ATTORNEYS

INVENTOR
TOMOO ATSUMI

BY

ATTORNEYS

INVENTOR
TOMOO ATSUMI

BY

ATTORNEYS

INVENTOR
TOMOO ATSUMI

BY

ATTORNEYS

AUTO-CHANGER

BACKGROUND OF THE INVENTION

The present invention generally relates to an auto-changer and more particularly relates to an auto-changer, provided with means to adjust the dropping position of the pickup arm, which is simple in mechanism, operates in a positive manner and can be produced easily economically in a compact form.

Recently, a variety of automatic record players have been developed with a view to simplifying the operation of playing a record. These automatic record players range from jukeboxes as being the most elaborate ones to the common record players as being the simplest ones. Some of these automatic record players are of the type, known as the auto-changer, by which a plurality of records mounted on the changer spindle are dropped on the turntable one after another and played automatically successively. These conventional auto-changers, however, without exception have the drawbacks that they are complicated in mechanism and low in productivity due to the technical problems involved in the production process, and further that they are large in size and so expensive as to be regarded as an article of luxury.

In addition, the conventional auto-changers are generally provided with the so-called record selector which detects the diameter of a record to be played by contact therewith and brings the pickup arm to a point above the edge of the record to drop it thereat. With such means, however, the needle on the pickup arm is not always positioned precisely at the starting point of the sound track on the record, the dropping position of the pickup arm being largely variable depending upon the angle at which the pickup arm is mounted on the pickup arm rotating shaft. Namely, with the conventional auto-changers, it is possible that the needle is dropped, for example, inwardly of a desired position, playing the record from an intermediate point of the recorded portion of the sound track or it is dropped in the nonrecorded portion of the sound track at the edge portion of the record, requiring a considerable length of time before the playing is actually started.

Conceivably, such drawback could be eliminated by adjusting the mounting angle of the pickup arm to the pickup arm rotating shaft and, in fact, there have been developed auto-changers in which a plurality of mounting plates are provided on the pickup arm rotating shaft so as to enable a minor adjustment to be made in the mounting angle of the pickup arm. However, the use of the mounting plates not only renders the construction of the auto-changer complicated but also increases the material costs, and in addition the balance of the pickup arm is largely influenced by said plates.

It is, therefore, the object of the present invention to provide an auto-changer on a commercial basis which is free from the aforementioned drawbacks of the conventional ones and which is simple in construction and advantageous from the standpoint of economy as well as productivity.

BRIEF DESCRIPTION OF THE DRAWINGS

The present invention will be more fully understood from the following detailed description when taken in conjunction with the accompanying drawings, in which the present invention is illustrated by way of example and in which.

DESCRIPTION OF THE PREFERRED EMBODIMENT

Figure 1:
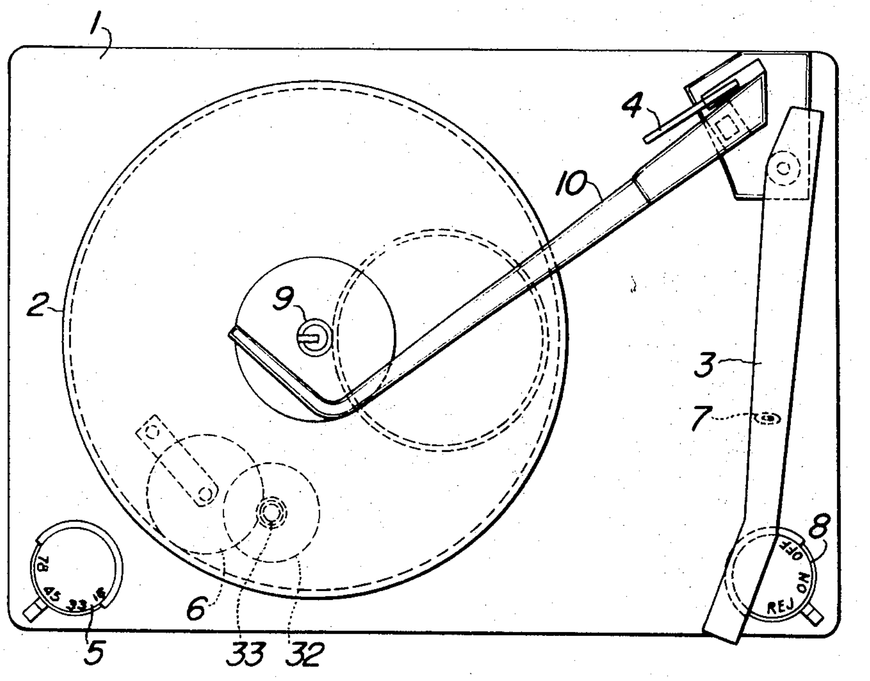
FIG. 1 is a top plan view of an embodiment of the auto-changer according to this invention.
Figure 2:
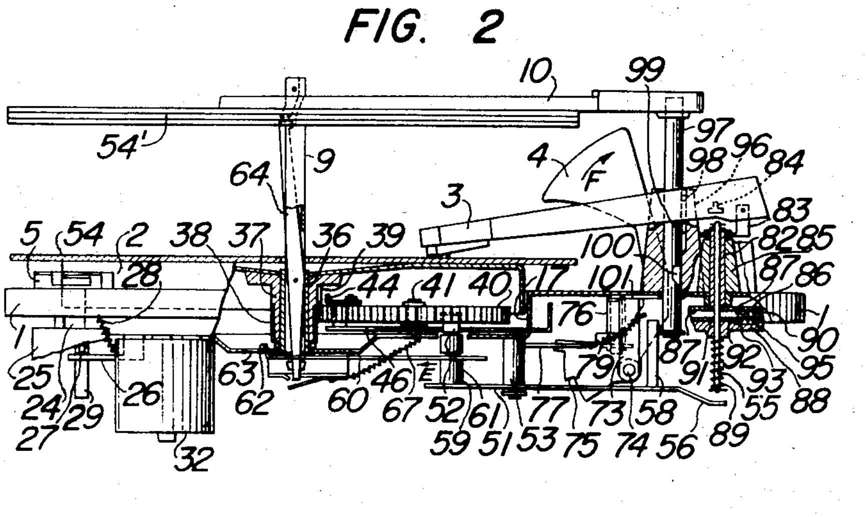
FIG. 2 is a side view, partially in section, showing the critical portion of the auto-changer shown in FIG. 1.
Figure 3:
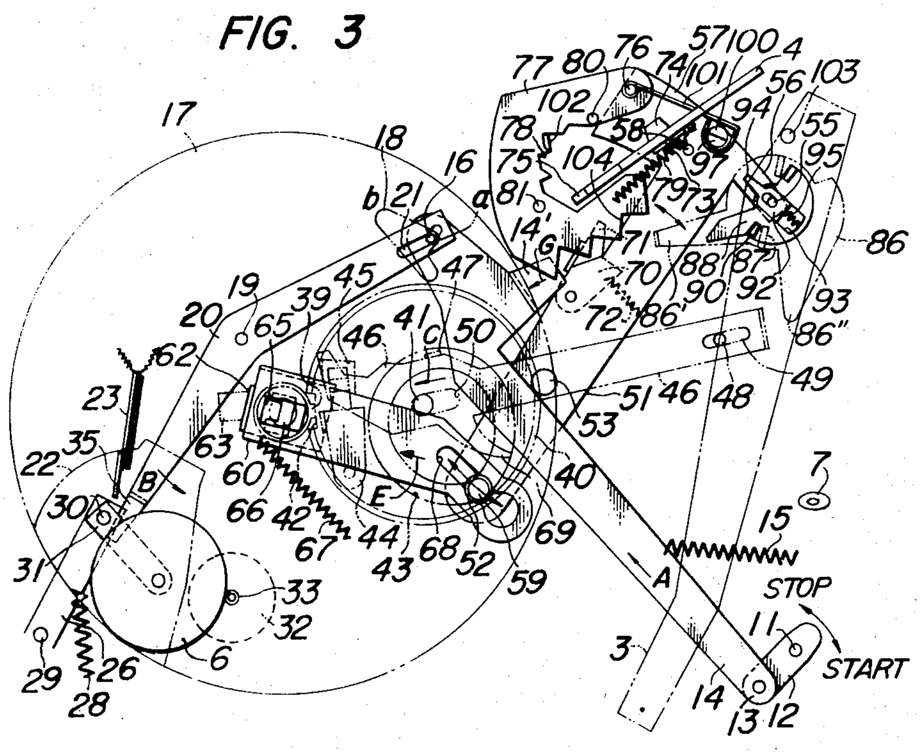
FIG. 3 is a top plan view of the mechanism shown in FIG. 2.
Figure 4:
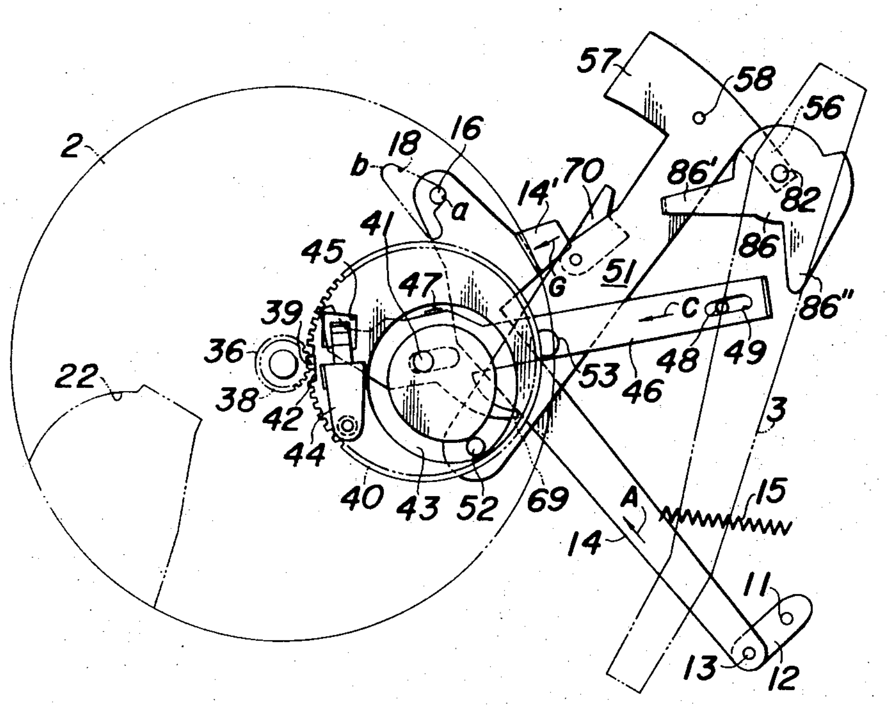
FIG. 4 is a top plan view showing the critical portion of the mechanism shown in FIG. 3.
Figures 5, 6A, 6B, 6C:
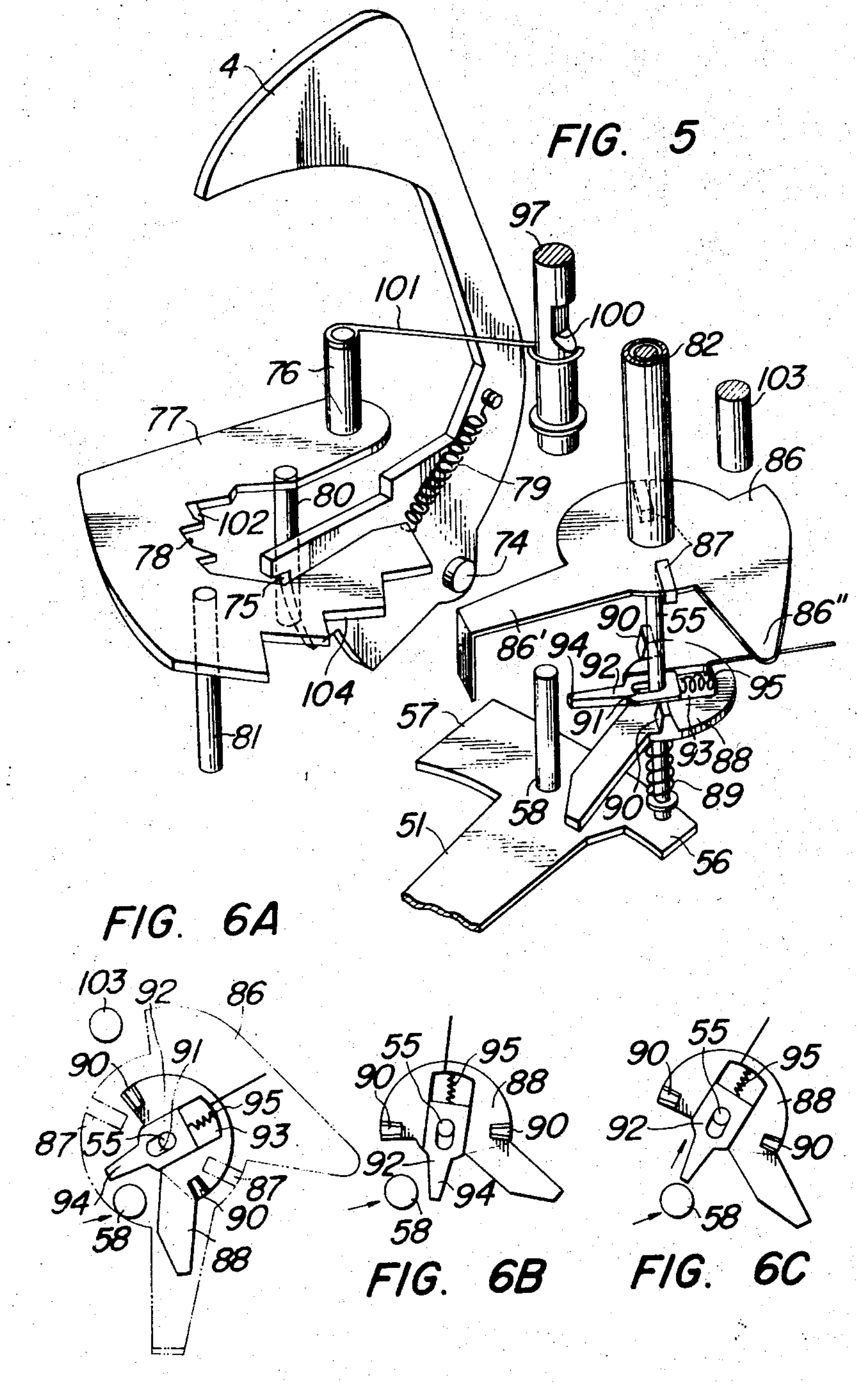
FIG. 5 is a perspective view showing the critical portions of a pickup arm operating mechanism and a record diameter detecting mechanism cooperating therewith.
FIGS. 6A, 6B and 6C are a set of views illustrating the operation of the pickup arm operating mechanism.

First of all, the construction of the auto-changer according to the present invention will be briefly described with reference to FIG. 1. On a panel 1 are disposed a turntable 2, a pickup arm 3, a record diameter detecting arm 4, a speed control knob 5, a turntable driving idler 6 to be operated by said knob 5, a pickup arm rest 7, a switching knob 8 to set the auto-changer for automatic playing operation, a spindle 9 to mount a plurality of records thereon in superposed relation and to drop said records one after another on the turntable 2 by an internal mechanism, and a record depressing arm 10 to hold the stack of records on the spindle 9 in a horizontal position.

These parts, disposed above the panel 1, are respectively operatively connected to the internal mechanisms shown in FIGS. 2 to 7. Namely, the switching knob 8 is fixedly mounted on a rotary shaft 11 extending outwardly through the panel 1, which rotary shaft 11 has a switching arm 12 fixedly connected to the lower end thereof. The switching arm 12 is pivotally connected at one end with a starting lever 14 by a pin 13. The starting lever 14 is biased towards the switching arm 12 by a spring 15 and carries at the other end portion thereof an upright pin 16, which is projecting above the surface of a concaved portion 17 of the panel 1, in which the turntable is mounted, through a cam hole 18. The top end of the upright pin 16 is received in a flexed guide slot 21 formed in one end portion of a flexed idler-off lever 20 which is pivotally mounted at an intermediate portion on the backside of the panel 1 by a pivot pin 19. The idler-off lever 20 has the other end flexed downwardly as at 35, and this downwardly flexed end 35 is located within a hole 22 formed in the concaved portion 17 of the panel 1 and operates an idler mechanism disposed in said hole 22 as well as a power switch 23 provided below the panel 1. The idler mechanism comprises an idler shifting cam 25 mounted to the lower end of a rotary shaft 24 fixed to the speed control knob 5 and an idler arm 26 provided thereon with a projection 27 which is held in pressure contact with a cam surface formed on the lower edge of said idler shifting cam 25 under the biasing force of a spring 28.

The idler arm 26 is pivotally mounted on a pin 29 extending downwardly from the underside of the panel 1 and carries at one end an idler supporting strip 31 pivotally connected thereto by a pin 30. The idler supporting strip 31 has the idler 6 rotatably mounted thereon. The drive shaft of a drive motor 32 is provided with a plurality of steps thereon to constitute a capstan 33. The peripheral edge of the idler 6 is in pressure contact with the capstan 33 and also with the inner peripheral wall of the turntable 2 to transmit the rotation of the capstan 33 to the turntable 2.

The idler-off lever 20 is arranged in such a way that, when it is operated, its fixed end 35 abuts against the pin 30 and thereby disconnects the idler 6 from the capstan 33 and the turntable 2 to interrupt the transmission of rotation from the drive motor 32 to the turntable 2. The drive motor 32 is electrically connected to the power switch 23 to be controlled thereby.

The turntable 2 to be driven from the drive motor 32 through the idler 6 has a mounting sleeve 37 fixed to the center of the underside thereof, by which the turntable is mounted on a bearing 36 upstanding on the center of the concaved portion 17 of the panel 1. The mounting sleeve 37 is formed thereon with a gear 38 and also with an axially extending elongated projection 39 above said gear 38. In the vicinity of the gear 38 is arranged a main gear 40 which is rotatably mounted on an upright pin 41 fixed on the panel 1 and by which all mechanisms in the auto-changer are operated. The main gear 40 has a notch 42 formed in the peripheral edge thereof and a substantially annular cam slot 43 formed in the body thereof. An actuating link 44 is pivotally mounted on the upper surface of the main gear 40 in the proximity of the notch 42. The free end of the actuating link 44 is extending downwardly through a window 45 formed in the main gear 40 and resting on an actuating plate 46 which extends below said window 45. The actuating plate 46 has a downwardly extending lug 47 formed at a portion thereof for engagement with the starting lever 14. The actuating plate 46 also has elongated slots 49 and 50 formed in the opposite end portions thereof, said slots 49 and 50 extending in the same direction and being in engagement with a fixed pin 48 and the fixed pivot pin 41 for the main gear 40 respectively, so that the actuating plate is movable in the direction of said slots.

A driving plate 51 is provided at one end with a roller 52 which is in engagement with the cam slot 43 in the main gear 40. Thus, when the main gear 40 is rotated, the roller 52 is displaced by the action of the cam slot 43, causing lateral swinging motion of the driving plate 51. The driving plate 51 is pivotally mounted on a pivot pin 53 on the panel 1 at a point closer to the roller 52. The other end of the driving plate 51 has a substantially T-shaped configuration. One of the arms 56 of the T-shaped end has a sloped surface for operating a pickup arm lifting rod 55 by which the pickup arm 3 is lifted or dropped on the record 54 or on the pickup arm rest 7, whereas the other arm 57 thereof is adapted to actuate the record diameter detecting mechanism. The driving plate 51 also carries at the other end an upright pin 58 which serves to cause a lateral swinging motion of the pickup arm 3, i.e., to bring the pickup arm 3 to above the edge portion of the record 54 from which the record is played or to bring the same from its position at the end of the playing to above the pickup arm rest 7.

A feed link 60 is formed at one end with a sliding slot 68 whose opposite edges are in sliding engagement with a reduced diameter portion 61 formed at an intermediate portion of a pin 59 on which the roller 52 is mounted. That end of the feed link 60 remote from the sliding slot 68 is formed in a lateral U-shaped cross-sectional configuration and the end extremity of the upper section of said U-shaped end is formed with a T-shaped projection 62, which is received in a sliding slot 63 in the panel 1. In the upper section of the U-shaped end of the feed link 60 is formed a throughhole 65 extending therethrough. The feeder 64 is connected integrally to said spindle 9 and serves to let the records 54' on the spindle 9 drop on the turntable 2 one after another. In the lower section of the U-shaped end of the feed link 60 is formed an opening 66 by which the feeder 64 extending therethrough is actuated on movement of the feed link 60. The feed link 60 is biased in a return direction by a return spring 67, so that it makes a reciprocal movement as the roller mounting pin 59 slides in the slot 68, with its end guided by the sliding slot 63.

The actuating plate 46 has a lug 69 formed at a location adjacent to the roller 52 for engagement with said roller, so that it may be returned to its original position by the action of said roller in engagement with said lug. A stopper plate 70 formed with a projection 71 is pivotally mounted on the intermediate portion of the driving plate 51 and biased by a return spring 72. This stopper plate 70 is engaged by an index plate to be described later when from the stack of records 54' the last one has been played, and pushes the starting lever 14 so as to stop the operation of the entire auto-changer.

The record diameter detecting arm 4 is pivotally connected to a support plate 73, mounted on the underside of the panel 1, by a pivot pin 74. That portion of the record diameter detecting arm 4 which is exposed above the panel 1 has a fan-shaped configuration, whereas the portion of the same located below the panel 1 is provided at its edge with steps 75 for engagement with a stepped notch 78 in the index plate 77. The index plate 77 is horizontally and pivotally mounted on a pin 76 extending downwardly from the underside of the panel 1. The index plate 77 also has steps formed on the outer edge thereof to limit the movement of a pickup arm position setting plate to be described later.

The index plate 77 and the record diameter detecting arm 4 are connected to each other by a coil spring 79 so as to produce a pressure contact between the steps of the respective members. On the index plate 77 are provided two pins 80 and 81 with a considerable space interval therebetween. The pin 81 is adapted to actuate the aforementioned stopper plate 70 on the driving plate 51 to stop the operation of the entire mechanism of the auto-changer as described previously, while the other pin 80 serves to drop the pickup arm 3 in a position determined by the cooperation of the record diameter detecting arm 4 and the index plate 77.

The pickup arm 3 is supported by a supporting member 83 fixed at the top end of a rotary shaft 82, which is journaled in a mounting sleeve 85 upstanding on the panel 1. The rotary shaft 82 has an axial hollow therein, with the aforementioned pickup lifting rod 55 extending therethrough. On the other hand, an abutment 84 is provided on the inner wall of the pickup arm 3 at a location above the top end of the pickup lifting rod 55, so that, when the pickup arm lifting rod 55 is moved upwardly, it hits the abutment lifting the pickup arm.

Fixedly secured to the lower end of the rotary shaft 82 is the pickup arm position setting plate 86 which is adapted to select the dropping position of the pickup arm 3 in accordance with the positions of the aforesaid record diameter detecting arm 4 and the cooperating index plate 77. This position setting plate 86 is provided on the underside thereof with two projections 87 at an angular space of about 180° therebetween. Below the position setting plate 86 is arranged an operating plate 88 in confronting relation thereto, which is axially movably and rotatably mounted on the pickup arm lifting rod 55. The operating plate 88 is provided on the upper surface thereof with two projections 90 which are spaced angularly by about 180° and held in pressure contact with the undersurface of the position setting plate 86 under the bias of a spring 89 provided on the pickup arm lifting rod 55. An auxiliary operating plate 92 is slidably received in a recess 93 formed in the upper surface of the operating plate 88 and has an elongated slot 91 therein through which the pickup arm lifting rod 55 extends. The auxiliary operating plate 92 has a projecting end 94 which is adapted to abut against the pin 58 on the driving plate 51 to effect the return movement of the pickup arm 3. The other end of the auxiliary operating plate 92 is connected to one end of a spring 95 which has the other end secured to the end wall of the recess 93 in the operating plate 88, whereby said auxiliary operating plate 92 is biased towards the pickup arm lifting rod 55. The position setting plate 86 operates in such a way that, when the pickup arm 3 has completed the playing of the record 54, one arm 86'' of said position setting plate 86 pushes the actuating plate 46.

A record depressing arm 10 to hold the stack of records 54' on the spindle 9 in a horizontal position is supported by an upright post 97 which in turn is journaled in a support sleeve 96 upstanding on the panel 1 in the vicinity of the pickup arm 3 and the record diameter detecting arm 4. The post 97 has a stopper pin 98 formed on the peripheral wall thereof, while the support sleeve 96 has a slit 99 formed in the inner wall thereof for receiving said stopper pin. In the lower portion of the post 97 is formed a notch 100 which is adapted to engage a set spring 101 to lock the post 97 when said post is moved to the lowest position.

A friction plate 102 is provided at the outermost end of the stepped notch 78 in the index plate 77 to avoid an erroneous operation possibly caused by the reaction of collision between said index plate 77 and the record diameter detecting arm 4. Reference numeral 103 designates a stopper provided on the inner wall of the pickup arm at a location adjacent to the position setting plate 86.

The auto-changer of this invention constructed as described above operates as follows: First of all, a desired number of records 54' are mounted on the spindle 9 upstanding at the center of the turntable 2 and are held in a horizontal position by means of the record depressing arm 10. In this case, the stack of records 54' is held horizontally by the weight of the record depressing arm 10 and its supporting post 97 journaled in the support sleeve 96 with the stopper pin 98 on said post 97 in engagement with the slit 99 in the inner wall of said sleeve.

After mounting the records, the switching knob 8 is turned from an OFF-position to an ON-position and further to an REJ (Reject)-position, whereupon the switching arm 12 is rotated in a direction which is the same as that in which said switching knob 8 is rotated and accordingly the starting lever 14 is moved in the direction of the arrow A. The movement of the starting lever 14 is transmitted to the idler-off lever 20 by way of the pin 16. Namely, when the switching knob 8 is turned to the ON-position, the pin 16 is moved to a point *a* of the cam hole 18 and the flexed end 35 of the idler-off lever 20 is swung in the direction of the arrow B. As a result, the pressure having been exerted on the contact member of the switch 23 by the flexed end of the idler-off lever 20 is removed to bring said switch in an ON-position and at the same time the idler 6 is permitted to move in the direction of the arrow B by the biasing force of the spring 28 to be brought into pressure contact with the capstan 33 of the drive motor 32 and the inner wall of the turntable 2. Thus, the turntable 2 is set in rotation. In this case, the gear 38 formed on the turntable mounting sleeve 37 is also rotated but the main gear 40 is not rotated because the gear 38 is located in the notch 42 in the main gear 40.

Upon rotating the switching knob 8 to the REJ-position, the starting lever 14 causes the actuating plate 46 to move in the direction of the arrow C by pushing the lug 47 of the latter and the pin 16 on the starting lever 14 moves to a point *b* of the cam hole 18 causing a further swinging of the idler-off lever 20 in the direction of the arrow B. Such movement of the idler-off lever, however, does not influence in any way on the other mechanisms. When the rotating force is removed from the switching knob 8, the pin 16 on the starting lever 14 returns to the point *a* of the cam hole 18 and is locked in that position.

The actuating plate 46, when moved in the direction of the arrow C, causes the actuating link 44 on the main gear 40 to move towards the gear 38 on the turntable 2, so that the actuating link 44 is kicked by the elongated projection 39 on the turntable mounting sleeve 37, whereby the main gear is revolved in a counterclockwise direction and brought into engagement with the gear 38 to be driven thereby. As the main gear 40 rotates, the roller 52 received in the cam slot 43 in said main gear is moved reciprocally as indicated by the arrow D by the action of said cam slot 43. Initially, the roller 52 is moved towards the center of the main gear 40 or in a clockwise direction as viewed in the FIG. and the driving plate 51, carrying said roller, is swung in a clockwise direction about the pivot pin 53 accordingly. By the clockwise swinging of the driving plate 51, the operating pin 80 on the index plate 77, which has previously been restrained by the operating arm 57 of the driving plate 51, is set free and thus the index plate 77 is allowed to revolved in a counterclockwise direction under the biasing force of the coil spring 79 mounted between the index plate 77 and the record diameter detecting arm 4. Consequently, a portion of the stepped edge 75 of the record diameter detecting arm 4 engages the outermost step *n* of the index plate and locked in that position under the force of the coil spring 79. Since the main gear 40 rotates and the driving plate 51 is swung clockwise even during this period, the pickup arm lifting rod 55, which was originally located at the end extremity of the arm 56 of the driving plate 51, is gradually lifted by the sloped surface of said arm 56 and finally brought into contact at its top end with the abutment 84 on the pickup arm 3, lifting said pickup arm from the pickup arm rest 7.

As the driving plate 51 further rotates clockwise, the pin 58 upstanding on said driving plate comes to abut against the arm of the operating plate 88 and causes said operating plate 88 to rotate idly until the projections 90 on said operating plate engage the respective projections 87 on the position setting plate 86. Upon engagement of the projections 90 with the respective projections 87, the position setting plate 86 is caused to rotate by the operating plate 88, rotating the pickup arm 3 in a counterclockwise direction to a point above the edge portion of the panel 1.

Figures 7A, 7B:
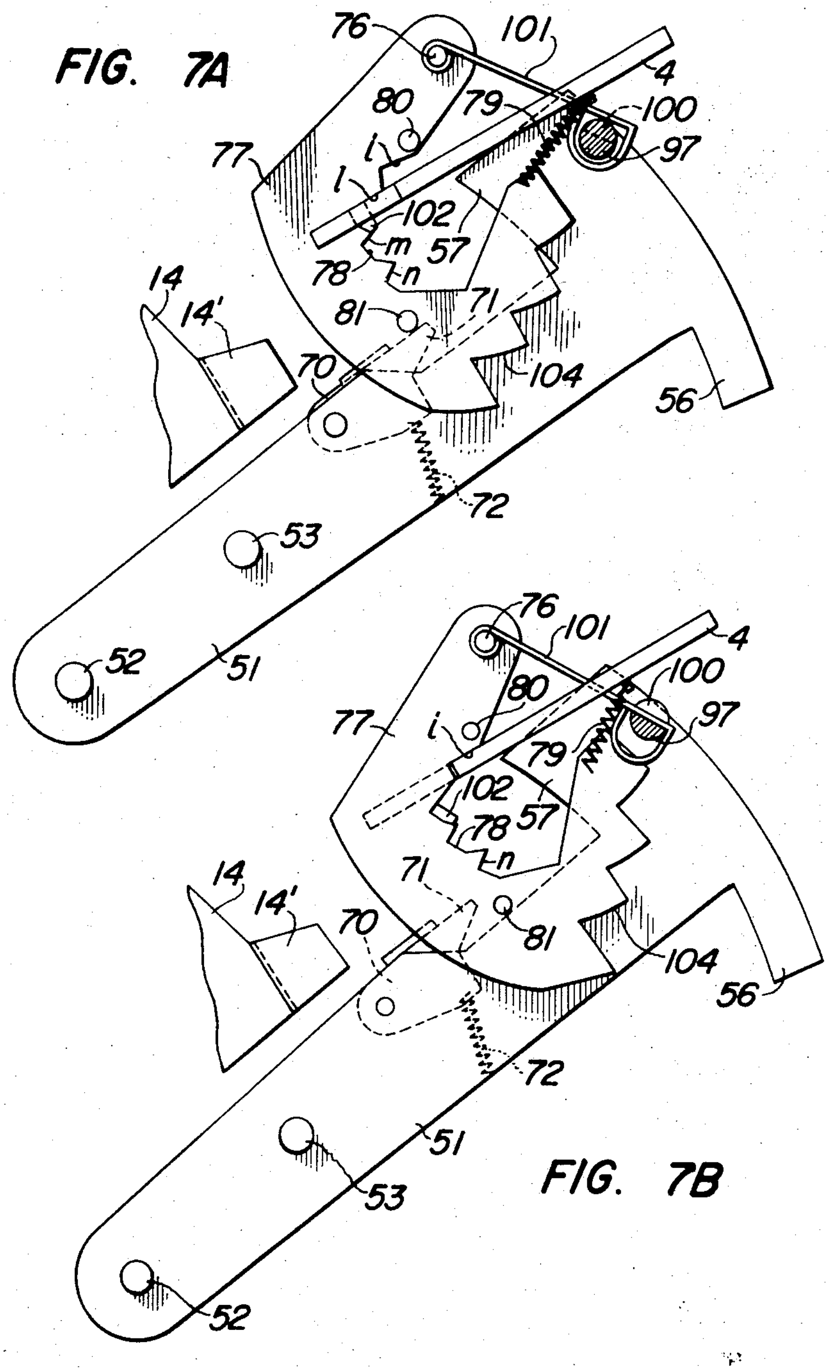
FIGS. 7A, 7B and 7C are views illustrating the operation of the record diameter detecting mechanism.

In this position of the pickup arm, the roller carrying pin 59, having been in sliding engagement at the reduced diameter portion 61 with the edges of the sliding slot 68, is located at the terminal end of said sliding slot 68. As the pin 59 further moves in a clockwise direction, the feed link 60 is moved in the direction of the arrow E. Therefore, the lower end of the feeder 64, integral with the spindle 9, is pressed by the edge of the hole 66 in said feed link, with the result that one of the records 54′ stacked on the spindle 9 is allowed to drop on the turntable 2. When the record dropping on the turntable 2 is of a diameter of 10 inches or 12 inches, the record diameter detecting arm 4 is forced outwardly by the edge of said record in the direction of the arrow F, but, when the record is of a diameter of 7 inches, the record diameter detecting arm 4 is brought into engagement at its intermediate portion with the set spring 101 and its stepped edge engages the step *n* of the index plate 77 to be locked almost in that position. In the case of the record being of a diameter of 10 inches or 12 inches, the record diameter detecting arm 4 is released from engagement with the step *n* of the index plate 77 and engages either a step *m* or *e* as shown in FIG. 7A, and locked in that position under the force of the coil spring 79.

During this period, the driving plate 51 further rotates clockwise and accordingly the operating plate 88 is further rotated by the upright pin 58 on the driving plate. The position setting plate 86 is finally brought into abutment at one end against a stopper 103 and held stationary without rotating the pickup arm 3 counterclockwise. However, since the operating plate 88 is continuously rotated by the pin 58, the projections 90 pass over the respective projections 87 on the position setting plate 86, by forcing said projection 87 upwardly and depressing the spring 89. At this point, the main gear 40 has completed about a half of its full turn and, of course, continues its counterclockwise rotation thereafter. By the rotation of the main gear 40 for another half of its full turn, the roller 52 is moved away from the center of the main gear 40, or in a counterclockwise direction. The counterclockwise movement of the roller 52 causes the driving plate 51 to rotate reversely in a counterclockwise direction and pushes the auxiliary operating plate 92 received in the recess 93 in the operating plate 88, by the pin 58. In this case, since the auxiliary operating plate 92 is slidable relative to the operating plate 88 longitudinally of the recess but not rotatable relative to said operating plate, the operating plate 88 is rotated clockwise by the auxiliary operating plate 92 which in turn is rotated by the pin 58 on the driving plate 51. As the operating plate 88 rotates clockwise, the flanks of the projections 90 push the flanks of the corresponding projections 87 on the position setting plate 86, and thus the position setting plate 86 and therefore the pickup arm 3 are rotated clockwise. Upon rotation of the position setting plate 86 through a certain angle, the projecting end 86′ thereof comes in abutment against the stepped edge of the index plate 77 and thereby further rotation of said position setting plate is prevented. However, since the driving plate 51 continues to rotate counterclockwise, with the pin 58 pushing the auxiliary operating plate 92, the projections 90 on the operating plate 88 again pass over the corresponding projections 87 on the position setting plate 86 and continue to revolve clockwise. As the driving plate 51 further rotates counterclockwise, the pickup arm lifting rod 55 gradually slides downwardly on the sloped surface of the arm 56 under the bias of the spring 89 and therefore the pickup arm 3 is lowered. Thus, the needle on the pickup arm 3 is placed at a point on the peripheral edge of the record 54, as determined by the index plate 77 and the position setting plate 86 in the manner described previously. Immediately thereafter, the operating arm 57 of the driving plate 51 pushes the operating pin 80 on the index plate 77, causing said index plate 77 to rotate largely in a clockwise direction, so that the record diameter detecting arm 4 is released from engagement with the step *m* or *e* of the index plate 77 and set in a free position. In this position, the index plate 77 will not interfere with the clockwise movement of the pickup arm 3 along the sound track on the record, enabling said pickup arm 3 to trace the sound track freely to the terminal end thereof.

Concurrently with the roller 52 commencing the counterclockwise movement, the feed link 60 slides in a direction opposite to the direction of the arrow E under the tension of the spring 67 to return to its original position. The actuating plate 46 is moved in a direction opposite to the direction of the arrow C by being pushed at its lug 69 by the roller 52, immediately after the main gear 40 and the roller 52 are set in motion, and returns to its original position.

At the time when the pickup arm 3 is dropped on the record 54, the main gear 40 has completed its full turn and the gear 38 on the turntable mounting sleeve 37 is again positioned in the notch 42 in said main gear, so that the main gear stops its rotation and the turntable 2 only rotates, playing the record thereon.

As the pickup arm 3 approaches the terminal end of the sound track, another projecting end 86″ of the position setting plate 86 gradually pushes the rear end of the actuating plate 46 in the direction of the arrow C and, upon completion of the playing, the actuating link 44 is projected into the notch 42 in the main gear 40, so that the actuating link 44 is kicked by the elongate projection 39 on the turntable mounting sleeve 37 as described previously, whereby the main gear 40 is rotated counterclockwise. Thus, the main gear 40 is brought into engagement with the gear 38 on said turntable mounting sleeve 37 to be rotated thereby counterclockwise.

Thereafter, each mechanism operates in the same manner as described previously. Namely, the driving plate 51 is operated to lift the pickup arm 3 and then the pickup arm 3 is rotated counterclockwise by the cooperation of the operating plate 88 and the position setting plate 86. Thereafter, the feed link 60 is operated to actuate the feeder 64 and the next record is placed on the turntable. In this case, the record diameter detecting arm 4 is kicked by the dropping record and set by the index plate 77 to determine the starting position of the pickup arm 3, which is followed by dropping of the pickup arm in that position and the record is played. This cycle of operation is repeated each time the records 54′ stacked on the spindle 9 are played individually.

Now, when the spindle 9 has been cleared of the records upon dropping the last record on the turntable 2, the record depressing arm 10 drops through the record depressing arm support sleeve 96, whereupon the set spring 101 engages the notch 100 formed in the record depressing arm support post 97 as shown in FIG. 7B and the set spring 101 makes a clockwise rotation to some degree. Therefore, the top end of the record diameter detecting arm 4 swings in a direction opposite to the direction of the arrow F by an amount equal to the amount of the clockwise swinging of the set spring 101. Under this state, the last record is played and, upon completion of the playing, the actuating plate 46 is pushed by the position setting plate 86 to operate the actuating link 44 and thereby the main gear is rotated counterclockwise.

Figure 7C:
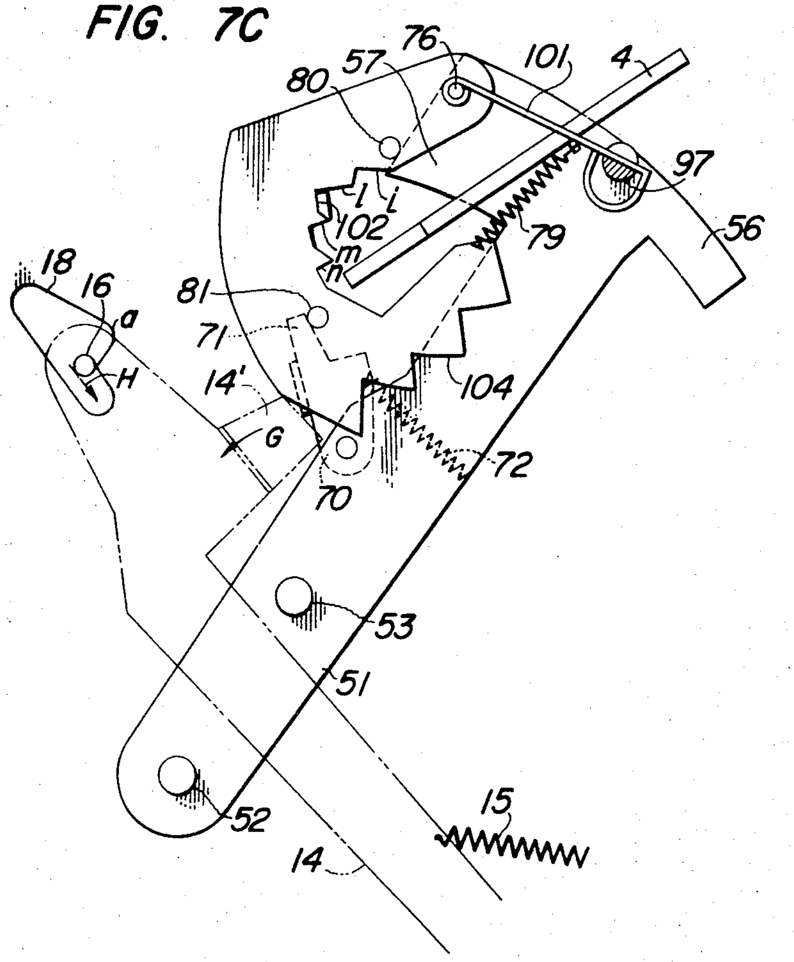

As the main gear 40 rotates, the roller 52 and the driving plate 51 are rotated clockwise, relaxing the index plate 77. The stepped edge 75 of the record diameter detecting arm 4 is brought into engagement with the step *i* on the index plate 77 and the index plate 77 is latched in a position at the end of its counterclockwise rotation. When the movement of the driving plate 51 is shifted from clockwise rotation to counterclockwise rotation under this condition, the operating pin 81 on the index plate 77 is pushed by the side edge of the stopper plate 70 on the driving plate 51, so that the index plate 77 is rotated in a clockwise direction and thus the operating pin 81 is located on the right-hand side of the projecting end 71 of the stopper plate 70 as shown in FIG. 7C. As the driving plate 51 further rotates counterclockwise, the stopper plate 70 is caused by the pin 81 to rotate counterclockwise slowly against the force of the spring 72. Then, the pin 80 is pushed by the arm 57 of the driving plate 51, so that the stopper plate 70 is largely rotated counterclockwise. As the stopper plate 70 nears the terminal end of its counterclockwise rotation, it pushes the lug 14′ on the starting lever 14 in the direction of the arrow G and the pin 16 on the actuating lever 14 is moved away from the point *a* in the cam hole 18, so that the starting lever 14 is pulled backwardly in a direction opposite to the direction of the arrow A by the tension of the spring 15. Consequently, the idler-off lever 20 is rotated in a direction opposite to the direction of the arrow B or in a clockwise direction and the idler 6 is disengaged from the capstan 33 and the inner peripheral wall of the turntable 2 to stop the rotation of the turntable 2 and to bring the switch 23 in an OFF-position by pushing the contact member thereof.

In this case, the main gear 40 has also completed its full turn and the projection end 71 of the stopper plate 70 has been disengaged from the operating pin 81. Therefore, the index plate 77 is held stationary, with its pin 80 being pressed by the arm 57 of the driving plate 51. Thus, the entire mechanism of the auto-changer is brought to a halt.

When the stopper plate 70 is rotated counterclockwise by the pin 81 on the index plate 77, the auxiliary operating plate 92 on the operating plate 88 is caused to rotate clockwise by the pin 58 on the driving plate 51 and accordingly the position setting plate 86 is rotated clockwise. However, the projecting end 86′ of the position setting plate 86 is soon brought into abutment against the stepped edge 104 of the index plate 77 and the rotation of the pickup arm 3 is stopped in this position, the operating plate 88 only being rotated past the projections 87 on the position setting plate 86. In this case, the pickup arm lifting rod 55 slowly slides downwardly on the sloped surface of the arm 56 of the driving plate 51, so that the pickup arm 3 is lowered accordingly to rest on the pickup arm rest 7. Thereafter, the arm 57 of the driving plate 51 pushes the pin 80 on the index plate 77 and the starting lever 14 is operated by the stopper plate 70, as described before, whereby the entire mechanism of the auto-changer is brought to a halt.

When a record is to be played again, the record depressing arm 10 is pulled up to the original position, whereupon the stopper spring 101 is disengaged from the notch 100 in the record depressing arm support post 97 and the auto-changer is set in a condition ready for playing the record.

Now, when the switching knob 8 is rotated to the REJ-position during the process of record playing, the actuating plate 46 is pushed in the direction of the arrow C by the starting lever 14 and the actuating link 44 is projected towards the peripheral edge of the main gear 40 to be kicked by the gear 38. Therefore, the main gear 40 is rotated in a counterclockwise direction and the pickup arm 3 is lifted in the manner described previously, stopping the playing of the record in the middle of the playing process. Thereafter, the entire mechanism of the auto-changer is set in its original position in the manner described to prepare for another cycle of record playing operation.

The auto-changer according to the present invention, which is described hereinabove, comprises the record diameter detecting mechanism, the position setting plate mounted on the pickup arm rotating shaft to select the dropping position of the pickup arm in cooperation with said record diameter detecting mechanism and provided on the bottom surface thereof with the two projections angularly spaced from each other by about 180°, the driving plate carrying the pin thereon and having the arm provided with a sloped surface, the pickup arm lifting rod extending through said pickup arm rotating shaft and slidably moved therein up and down by the sloped surface of said driving plate, and the operating plate having the projections provided on the upper surface thereof for engagement with the projections on said position setting plate and the recess formed in said surface with the auxiliary operating plate slidably received therein, said operating plate being held in pressure contact with said position setting plate by the spring, and said operating plate and said auxiliary operating plate being operated by the pin on said driving plate to thereby effect a reciprocal movement of the pickup arm, operates in a highly stable and positive manner and is entirely free of defective operation.

In addition, because of the simple construction, the auto-changer of this invention can be produced with high efficiency, economical advantages and in a compact form.

Figure 8:
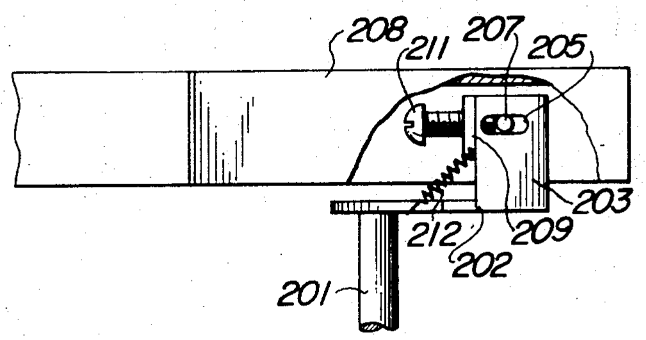
FIG. 8 is a side elevational view, partially broken away, of means for adjusting the dropping position of the pickup arm.

Now, the mechanism for adjusting the dropping position of the pickup arm according to this invention will be described by way of example with reference to FIGS. 8 and 9. The rotating shaft 201 of the pickup arm, journaled in the support sleeve 85, has a mounting plate 202 fixed to the top end thereof. The mounting plate 202 has two upright members 203 and 204 mounted to the opposite edges thereof. The upright member 203 has a slot 205 formed therein, while the upright member 204 has a circular throughhole 206 formed therein. A horizontal pin 207 having both ends secured in the opposite sidewalls of the pickup arm 208 is extending through said slot 205 and said hole 206. The upright member 204 has one end flexed as at 209, in which an internally threaded hole 210 is bored. A setscrew 211 is screw-threaded through the hole 210 for the adjustment of the mounting angle of the pickup arm 208. The horizontal pin 207 is biased by a spring 212 as shown so that it may be held in pressure contact with the inner end of the setscrew 211. Thus, it will be understood that, by screwing the setscrew 211, the horizontal pin 207 is pivoted about the throughhole 206 in a direction of the arrow.

Figure 9:
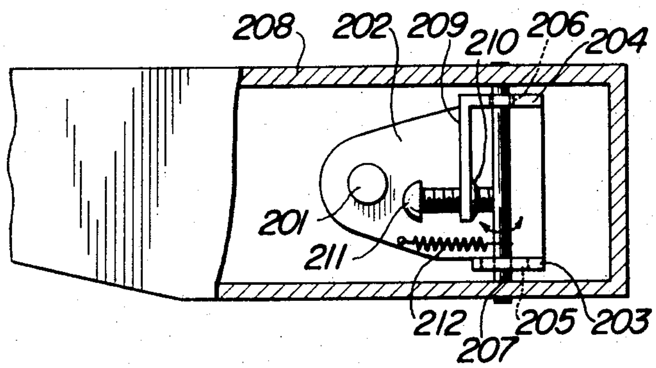
FIG. 9 is a bottom view of the means shown in FIG. 8.

When the needle of the pickup arm drops inwardly of the outermost turn of the sound recorded track on a record to be played by a record player of the type in which the pickup arm makes a clockwise rotation for playing the record, the setscrew 211 is rotated clockwise to swing that end of the horizontal pin closer to the slot 205 in a rightward direction as viewed in FIG. 9. The pickup arm 208, therefore, is swung in a counterclockwise direction with respect to the pickup arm rotating shaft 201, so that the needle may be dropped in the outermost turn of the sound recorded track on the record.

On the other hand, when the needle of the pickup arm drops in the nonsound recorded track exterior of the outermost turn of the sound recorded track, the setscrew 211 is rotated in a counterclockwise direction as opposed to the preceding case to swing the pickup arm 208 clockwise with respect to the shaft 201 and thereby it is possible to drop the needle in the outermost turn of the sound recorded track as desired.

As described, the mechanism for adjusting the dropping position of the pickup arm of this invention, which comprises the pickup arm mounting plate and the horizontal pin supporting the pickup arm at both ends and mounted on said mounting plate in such a manner that one end thereof only is swingable by the setscrew, is simple in construction and capable of adjusting the dropping position of the needle quickly and precisely so that said needle may be dropped in the outermost turn of the sound recorded track on the record, by a simple operation of screwing the setscrew either clockwise or counterclockwise.

I claim:

1. An auto-changer comprising a drive motor, a pickup arm, a switching knob, a starting lever operated by said switching knob, an idler-off lever operatively connected to said starting lever and adapted to energize said drive motor, a capstan, a turntable having a turntable gear thereon and a changer spindle projecting axially upwardly therefrom, an idler operated by said idler-off lever to selectively be brought into engagement with said capstan and said turntable to transmit and interrupt the drive of said drive motor from the capstan to the turntable, a main gear having a substantially annular cam slot formed therein and mounted on said main gear to bring it into engagement with said turntable gear, an actuating plate operatively connected to said starting lever to operate said actuating link for driving said main gear by the drive from the drive motor, a driving plate having a roller at one end which roller is moved reciprocally in engagement with said annular cam slot formed in said main gear, an arm on the other end of said driving plate having a sloped surface adapted to move said pickup arm vertically and carrying a pin for horizontal movement of said pickup arm, a feeder adapted to drop on the turntable successively, a plurality of records mounted on the changer spindle, a feed link operatively connected to said driving plate to operate said feeder, a record diameter detecting arm projecting above the turntable and adapted to detect the diameter of the record dropping onto the turntable, a position setting plate mounted on a rotating shaft of the pickup arm and rotated by the pin on said driving plate to select the dropping position of the pickup arm, an index plate provided below said record diameter detecting arm and having thereon stepped notch sides respectively adapted to engage the stepped edge of said record diameter detecting arm and to engage one projecting end of said position setting plate so as to limit the rotation of said position setting plate and accordingly the rotation of the pickup arm, and an operating plate cooperating with said position setting plate to effect reciprocal movement of the pickup arm, said index plate having thereon a first pin positioned near its rotation axis and a second pin positioned remote from the axis as compared with the first pin, said driving plate performing a reciprocal rotative motion and further having therein a stopper plate freely rotatably mounted spaced from its rotational center and an operating arm further remote from the center for operating said first pin, whereby one motion of said driving plate enables it to abut against the second pin of said index plate at its intermediate portion and thereafter to abut against the first pin at the operating arm and with further drive of the driving plate through said second-mentioned abutment causes the second pin to move away therefrom to operate said stopper plate to push said starting lever to operate said idler-off lever for control of an energization switch of the motor.

2. An auto-changer as set forth in claim 1, in which said actuating plate is further provided with a notch in the peripheral edge portion, said actuating link being pivotally mounted on said main gear in the vicinity of said notch and having a leading end portion U-shaped which projects downwardly through an aperture window formed in the main gear and is adapted to be horizontally and vertically rotatable, said actuating plate being disposed below said main gear and adapted to be driven by said position setting plate to the center of a record disc as it is played back, and said actuating plate being further provided with a lug member for engaging the roller of said driving plate to reset itself and with one end part engaging the U-shaped portion of the actuating link to thereby reset it, said engagement being brought about by the rotation of the main gear toward said one end part whereby the U-shaped portion is rested on the actuating plate and is carried to engage an elongated projection formed axially on a turntable mounting sleeve centrally depending from the turntable upon completion of the record playing, and thereby said main gear is engaged with the gear on said mounting sleeve which causes the rotation thereof resulting in removing said U-shaped portion from the actuating plate and positioning it below this plate.

3. An auto-changer as set forth in claim 1, in which said record diameter detecting arm is pivotally mounted above said turntable, said index plate being mounted horizontally in confronting relation to said record diameter detecting arm, spring means connecting said record diameter detecting arm and said index plate, a record depressing arm mounted to hold a stack of records on the changer spindle in a horizontal position and a support post for said record depressing arm having a notch formed at an intermediate portion thereof and having a set spring wound thereon, whereby, when said record depressing arm support post moves to its lowest position, said set spring falls in said notch causing said record diameter detecting arm to swing wide thereby moving the index plate accordingly to limit the rotation of the pickup arm and to drop said pickup arm on the pickup arm rest.

4. An auto-changer as set forth in claim 1, in which said position setting plate is mounted on said rotating shaft of the pickup arm to cooperate with the record diameter detecting mechanism to select the pickup arm dropping position, said position setting plate having on the bottom surface thereof two projections angularly spaced from each other by about 180°, said rotating shaft of the pickup arm having an axial bore therein with a pickup arm lifting rod extending therethrough, said pickup arm lifting rod being moved vertically by the sloped surface of the arm of said driving plate and having said operating plate mounted thereon, said operating plate being provided with two projections on the upper surface thereof at locations corresponding to the respective projections on said position setting plate and formed in said surface with a recess for slidably receiving an auxiliary operating plate therein, spring means biasing said operating plate in pressure contact with said position setting plate being operated by the pin on said driving plate to cause a reciprocal motion of the pickup arm.

5. The pickup arm as set forth in claim 1, further comprising means for adjusting the dropping position of said pickup arm, said means comprising a pickup arm mounting plate mounted on the pickup arm at both ends thereof and supported by said mounting plate, and a setscrew operative to displace only one end of said horizontal pin.